United States Patent
Chen et al.

(10) Patent No.: US 12,189,917 B2
(45) Date of Patent: Jan. 7, 2025

(54) METHOD AND APPARATUS FOR CONTROLLING ICON DISPLAY, AND ELECTRONIC DEVICE

(71) Applicant: VIVO MOBILE COMMUNICATION CO., LTD., Dongguan (CN)

(72) Inventors: Zhe Chen, Dongguan (CN); Xuan Zhou, Dongguan (CN); Ruiqi Wang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/178,039

(22) Filed: Mar. 3, 2023

(65) Prior Publication Data

US 2023/0205391 A1    Jun. 29, 2023

Related U.S. Application Data

(63) Continuation of application No. PCT/CN2021/115953, filed on Sep. 1, 2021.

(30) Foreign Application Priority Data

Sep. 4, 2020   (CN) .......................... 202010923448.6

(51) Int. Cl.
G06F 3/04817   (2022.01)
G06F 3/04845   (2022.01)
G06F 3/0486    (2013.01)
G06F 3/04883   (2022.01)

(52) U.S. Cl.
CPC ...... *G06F 3/04817* (2013.01); *G06F 3/04845* (2013.01); *G06F 3/0486* (2013.01); *G06F 3/04883* (2013.01); *G06F 2203/04806* (2013.01)

(58) Field of Classification Search
CPC .......................... G06F 3/04817; G06F 3/04845
See application file for complete search history.

(56) References Cited

U.S. PATENT DOCUMENTS

| | | | | |
|---|---|---|---|---|
| 8,223,165 | B1 * | 7/2012 | Jitkoff ........................ | G06T 3/04 345/670 |
| 8,316,312 | B2 * | 11/2012 | Kim ........................ | G06F 3/0481 715/846 |
| 9,367,206 | B2 | 6/2016 | Koo et al. | |
| 9,983,764 | B2 * | 5/2018 | Huang ................ | G06F 3/04886 |
| 10,235,030 | B2 * | 3/2019 | Cho ........................ | G06F 3/04842 |
| 10,387,014 | B2 * | 8/2019 | Kim ........................ | G06F 3/04845 |
| 11,137,904 | B1 * | 10/2021 | Tyler ........................ | G06F 3/04817 |
| 2007/0079255 | A1 * | 4/2007 | Gourdol ................ | G06F 9/451 715/815 |
| 2013/0042191 | A1 * | 2/2013 | Kim ........................ | G06F 3/0481 715/765 |

(Continued)

FOREIGN PATENT DOCUMENTS

| CN | 102163129 A | 8/2011 |
|---|---|---|
| CN | 103226429 A | 7/2013 |

(Continued)

*Primary Examiner* — Asher D Kells
(74) *Attorney, Agent, or Firm* — The Webb Law Firm

(57) ABSTRACT

An icon display control method includes: receiving a first input performed by a user on a first icon; and updating a first icon display parameter of the first icon in response to the first input; where the first icon display parameter includes at least one of the following: shape or display size.

10 Claims, 9 Drawing Sheets

(56) References Cited

U.S. PATENT DOCUMENTS

| | | | |
|---|---|---|---|
| 2013/0063492 A1* | 3/2013 | Washington | G09G 5/003 |
| | | | 345/660 |
| 2013/0201208 A1 | 8/2013 | Cho et al. | |
| 2013/0305187 A1* | 11/2013 | Phillips | G06F 3/0481 |
| | | | 715/800 |
| 2013/0311920 A1* | 11/2013 | Koo | G06F 3/04817 |
| | | | 715/765 |
| 2014/0201655 A1 | 7/2014 | Mahaffey et al. | |
| 2014/0359605 A1* | 12/2014 | Leet | G06F 21/10 |
| | | | 717/174 |
| 2016/0004416 A1* | 1/2016 | Kim | G06F 3/04817 |
| | | | 715/769 |
| 2016/0034153 A1* | 2/2016 | Lejeune | G06F 3/04845 |
| | | | 715/765 |
| 2016/0077720 A1* | 3/2016 | Park | G06F 3/04883 |
| | | | 715/765 |
| 2017/0255371 A1* | 9/2017 | Han | G06F 3/0412 |
| 2020/0241732 A1* | 7/2020 | Lu | G06F 3/04842 |
| 2021/0286510 A1* | 9/2021 | Tyler | G06F 3/0485 |
| 2023/0068100 A1* | 3/2023 | Yang | G06F 9/451 |
| 2023/0168790 A1* | 6/2023 | Shiina | G06F 3/04845 |
| | | | 715/815 |

FOREIGN PATENT DOCUMENTS

| | | |
|---|---|---|
| CN | 106293412 A | 1/2017 |
| CN | 106527871 A | 3/2017 |
| CN | 108647079 A | 10/2018 |
| CN | 109663345 A | 4/2019 |
| CN | 112099686 A | 12/2020 |
| EP | 2664983 A2 | 11/2013 |
| JP | 2014102575 A | 6/2014 |
| JP | 2017223766 A | 12/2017 |
| JP | 202080051 A | 5/2020 |

\* cited by examiner

METHOD AND APPARATUS FOR CONTROLLING ICON DISPLAY, AND ELECTRONIC DEVICE

CROSS-REFERENCE TO RELATED APPLICATIONS

This application is a Bypass Continuation Application of PCT/CN2021/115953 filed Sep. 1, 2021, and claims priority to Chinese Patent Application No. 202010923448.6 filed on Sep. 4, 2020, the disclosures of which are hereby incorporated by reference in their entireties.

BACKGROUND OF THE INVENTION

Field of the Invention

This application pertains to the field of communication technologies, and relates to an icon display control method and apparatus, and an electronic device.

Description of Related Art

At present, users can organize desktop application icons only through collection using folders and adjustment of application positions. However, shapes and sizes of application icons on the desktop of the mobile phone are set by default, and in the prior art, icon movement may fail or needs to be performed for a plurality of times, featuring cumbersome operations. For example, in a process of moving an icon from a first screen to a second screen, if an area of a vacant region of the second screen is smaller than an area required by the icon, icon movement may fail this time, and the user needs to give up moving the icon this time. Instead, the user first moves at least one icon from the second screen to another screen, and then moves the icon from the first screen to the second screen.

SUMMARY OF THE INVENTION

According to a first aspect, an embodiment of this application provides an icon display control method, where the method includes:

receiving a first input performed by a user on a first icon; and updating a first icon display parameter of the first icon in response to the first input; where the first icon display parameter includes at least one of the following: shape or display size.

According to a second aspect, an embodiment of this application provides an icon display control apparatus, where the apparatus includes:

a first receiving module, configured to receive a first input performed by a user on a first icon; and a first updating module, configured to update a first icon display parameter of the first icon in response to the first input; where the first icon display parameter includes at least one of the following: shape or display size.

According to a third aspect, an embodiment of this application provides an electronic device, where the electronic device includes a processor, a memory, and a program or instructions stored in the memory and executable on the processor, and when the program or the instructions are executed by the processor, the steps of the method according to the first aspect are implemented.

According to a fourth aspect, an embodiment of this application provides a non-transitory readable storage medium, where a program or instructions are stored in the non-transitory readable storage medium, and when the program or the instructions are executed by a processor, the steps of the method according to the first aspect are implemented.

According to a fifth aspect, an embodiment of this application provides a chip, where the chip includes a processor and a communications interface, the communications interface is coupled to the processor, and the processor is configured to run a program or instructions to implement the method according to the first aspect.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, "and/or" in this specification and claims indicates at least one of connected objects, and the symbol "/" generally indicates that the associated objects are in an "or" relationship.

The following describes in detail an icon display control method according to the embodiments of this application by using specific embodiments and application scenarios thereof with reference to the accompanying drawings.

Figure 1:
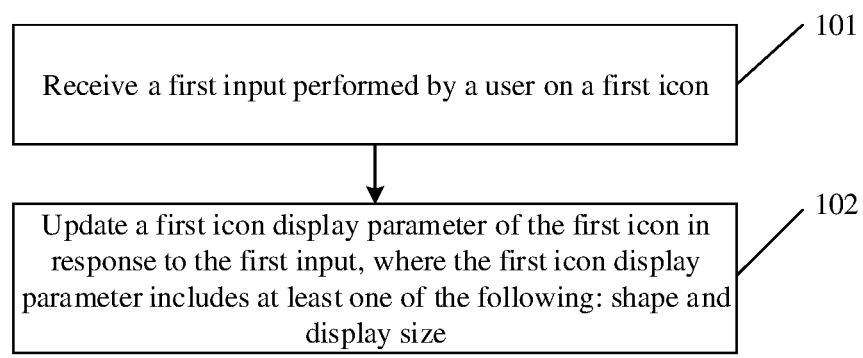
FIG. 1 is a flowchart of an icon display control method according to an embodiment of this application.

The icon display control method provided in this embodiment of this application includes the following steps, as shown in FIG. 1.

Step 101: Receive a first input performed by a user on a first icon.

The first input may be an input such as a tap operation or a drag operation, and the first icon is any one icon on any one screen of a desktop of an electronic device, which is not limited herein.

Step 102: Update a first icon display parameter of the first icon in response to the first input, where the first icon display parameter includes at least one of the following: shape or display size.

Updating the first icon display parameter may be: corresponding to a case that the user manually indicates deformation, updating the first icon display parameter based on a deformation fixed point of the first icon, a first spatial feature of a first region, and a preset deformation priority of the first icon, where the first region is a display region of a preset range including the first icon, and the first spatial feature includes the number of and display positions of vacant icon positions in the first region. Updating the first icon display parameter may be: corresponding to a case that the user indicates moving the first icon to a first target region and the first target region includes a display region of a first vacant icon position, updating the first icon display parameter based on an icon position display parameter of the first vacant icon position. Updating the first icon display parameter may be: corresponding to a case that the user indicates duplication a display parameter of a second icon for the first icon, that is, in a case that the first input is an input of dragging the first icon to a second target region and the second target region is a display region of the second icon, updating the first icon display parameter based on a second icon display parameter of the second icon. The first icon display parameter may include a display position, which is not limited herein. Updating the first icon display parameter may be understood as performing deformation on the first icon. Optionally, before the receiving a first input performed by a user on a first icon, the method further includes: receiving a second input performed by a user on the first icon; obtaining an icon redrawing attribute of the first icon and an icon adjustability attribute of the first icon in response to the second input; determining a deformation controlling sign of the first icon based on the icon redrawing attribute and the icon adjustability attribute; and displaying the deformation controlling sign in a preset region of the first icon. The receiving a first input performed by a user on a first icon includes: receiving a first input performed by a user on the deformation controlling sign.

That is, the deformation controlling sign is determined based on two attributes of the first icon, and the first input is an input on the deformation controlling sign, where the first input may be a tap operation. The deformation controlling sign may have many forms. For example, for an icon that supports deformation and for which a space for deformation is present, the deformation controlling sign is displayed normally at a preset position of the icon; for an icon that supports deformation and for which no space for deformation is present, the deformation controlling sign is grayed out at a preset position of the icon; and for an icon that does not support deformation, the deformation controlling sign is displayed in a dashed line at a preset position of the icon or may not be displayed. This can help the user to identify whether the icon can be deformed, and assist the user in quick decision-making on whether to perform icon deformation.

The icon redrawing attribute may be a file redrawing capability that is provided by an application corresponding to the icon; and the icon adjustability attribute may be a capability of icon deformation being allowed in a display region of a preset range of the icon. The redrawn file includes optional values for updating an icon display parameter provided by the application.

In this embodiment of this application, after the updating a first icon display parameter of the first icon in response to the first input, the method further includes: obtaining an icon redrawing attribute and an icon adjustability attribute of the first icon that is updated, re-determining the deformation controlling sign, and updating display of the deformation controlling sign.

For example, the icon redrawing attribute and icon adjustability attribute of the first icon before updating of the first icon display parameter are respectively a first redrawing attribute and a first adjustability attribute, and the first sign is displayed on the first icon. After the updating, an icon adjustability attribute of the newly obtained first icon becomes a second adjustability attribute, and the first sign of the first icon is updated to a second sign. In addition, in a case that a display position of one icon changes, a deformation controlling sign on the icon may also be automatically updated based on a change of an icon adjustability attribute of the icon with a changed display position. The updating control principle is similar to the control principle for updating display of the deformation controlling sign described above, which is not described herein again.

Figure 2:
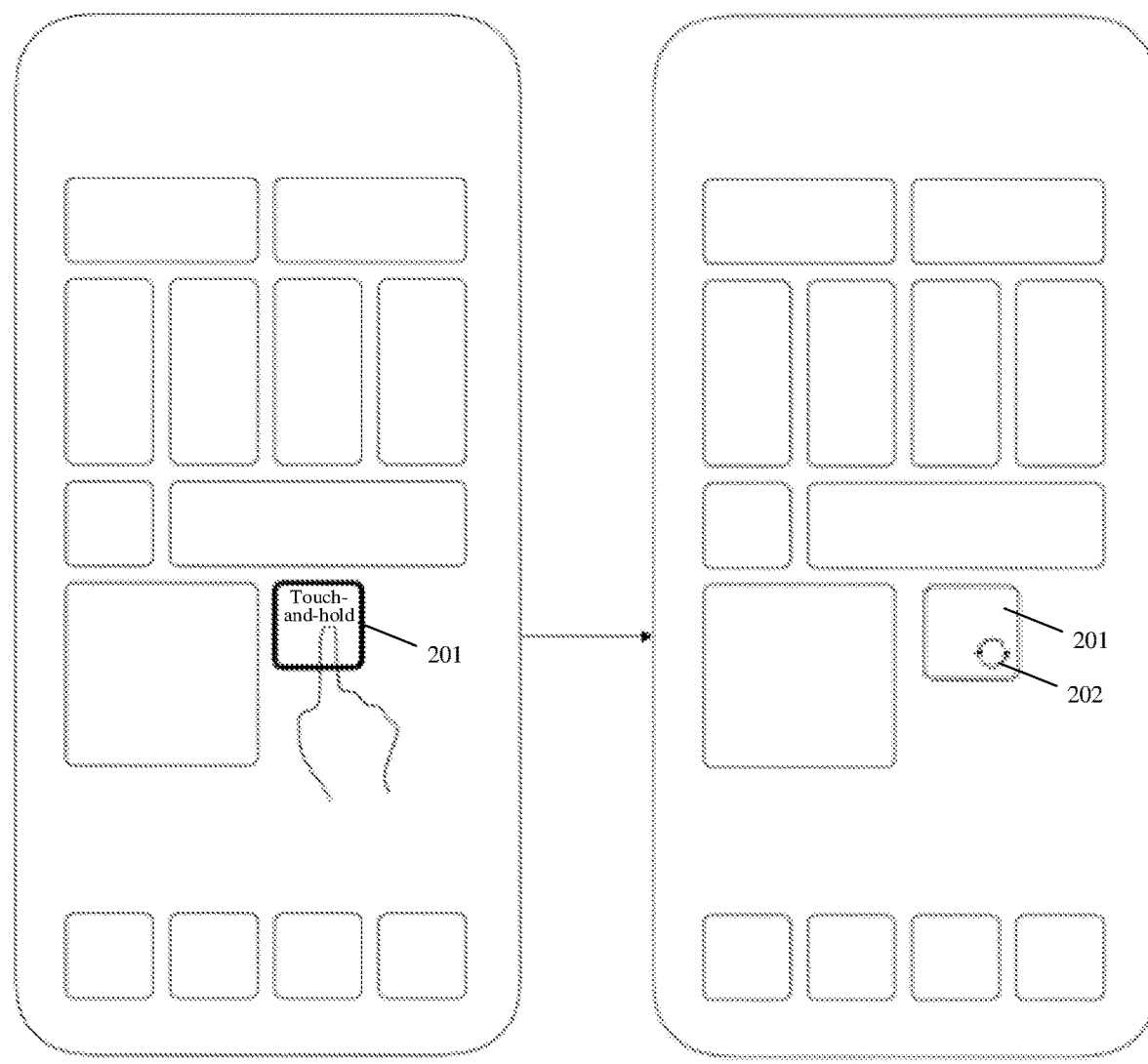
FIG. 2 is a schematic diagram of screens with a deformation controlling sign according to an embodiment of this application.

Optionally, the icon redrawing attribute includes the first redrawing attribute and the second redrawing attribute, the first redrawing attribute is icon redrawing being supported by a program corresponding to the first icon, and the second redrawing attribute is the icon redrawing being not supported by the program corresponding to the first icon. The icon adjustability attribute includes the first adjustability attribute and the second adjustability attribute, the first adjustability attribute is a space for deformation of the first icon being present in a display region of a preset range including the first icon, and the second adjustability attribute is the space for deformation of the first icon being absent in the display region of the preset range including the first icon. The space for deformation of the first icon being present includes: at least one vacant icon position being present. In this way, it can be ensured that normal deformation operations can be implemented for a to-be-deformed icon. The preset range may be a range of a region having a specific area and including the first icon, for example, may be a square region using an icon 201 in FIG. 2 as a center, where a length and width of this square are three times a width of the icon 201. The shape of the display region of the preset range includes but is not limited to shapes such as square or rectangle, and the size of the preset range can be flexibly set by a user, which is not limited herein.

Whether the program supports icon redrawing may be whether the application corresponding to the icon can provide a file redrawing capability; and whether a space for deformation for the first icon is present in the display region of the preset range of the first icon may be whether any vacant region for deforming the first icon is present in the display region of the preset range of the first icon. For example, for the icon 201 selected by a user in FIG. 2, a space for deformation is correspondingly present, and no space for deformation is present for an adjacent icon on the left side of the icon 201.

Optionally, the determining a deformation controlling sign of the first icon based on the icon redrawing attribute and the icon adjustability attribute includes: in a case that the icon redrawing attribute is the first redrawing attribute and the icon adjustability attribute is the first adjustability attribute, determining a first sign as the deformation controlling sign of the first icon, where the first sign indicates that the first icon supports deformation and a space for deformation is present; in a case that the icon redrawing attribute is the first redrawing attribute and the icon adjustability attribute is the second adjustability attribute, determining a second sign as the deformation controlling sign of the first icon, where the second sign indicates that the first icon supports deformation and that no space for deformation is present; or in a case that the icon redrawing attribute is the second redrawing attribute, determining a third sign as the deformation controlling sign of the first icon, where the third sign indicates that the first icon does not support deformation. The updating a first icon display parameter of the first icon includes: in a case that the deformation controlling sign of the first icon is the first sign, updating the first icon display parameter of the first icon.

The second sign may be a first sign that is grayed out; and the third sign may be a transparent sign. For example, in a case that touch-and-hold is performed, the deformation controlling sign is displayed. For the first sign, refer to the sign 202 in FIG. 2. For the second sign, it can be understood as a case with no space for deformation. In a case that deformation cannot be performed due to no space at a position at which the icon is located, the second sign is displayed, and a "deform" control may be grayed out. For the third sign, it can be understood that deformation is not supported: when the application provides no redrawn file, the "deform" control is not displayed. The deformation controlling sign may be a pattern, a graph, a picture, a symbol, or the like, indicating an icon redrawing attribute and icon adjustability attribute.

The icon deformation described above may be implemented as manual icon deformation, where icon deformation control depends on two conditions: A. whether the application provides a redrawn file, that is, whether the application itself supports icon deformation; and B. whether there is sufficient space around the icon for deformation when the user tries to perform icon deformation.

For example, after touch-and-hold is performed on the icon, for the case of the foregoing first sign, that is, for the application that supports deformation and has sufficient space around, the deformation controlling sign may be displayed in the lower right corner of the icon, that is, a deform control is displayed; for the case of the second sign, that is, for the application that supports deformation but has no sufficient space around, the deformation controlling sign may be displayed in the lower right corner of the icon, that is, a deform control grayed out is displayed, indicating that the function is present but temporarily unavailable; and for the case of the foregoing third sign, that is, for the application that does not support deformation, no deformation controlling sign may be displayed in the lower right corner of its icon, that is, there is no deform control.

Figure 3:
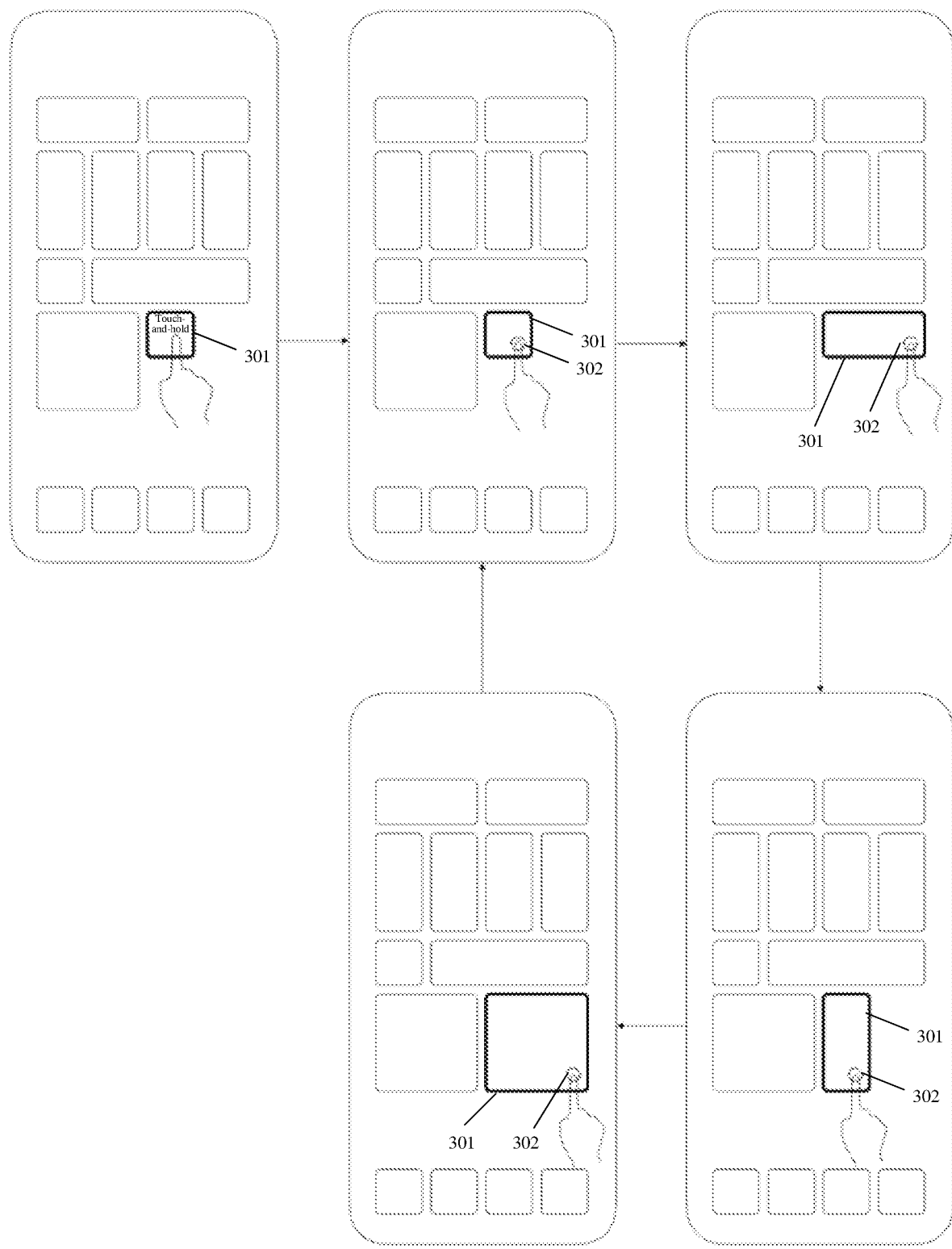
FIG. 3 is a first schematic diagram of screens illustrating a deformation process of a first icon according to an embodiment of this application.

For the case of the first sign, for example, as shown in FIG. 3, touch-and-hold is performed on a desktop icon 301, and a first sign 302 is displayed on the desktop icon 301, that is, a "deform" control is displayed. When it is detected that the user taps this sign, icon deformation is performed. For the deformation, deformation may be performed at least once based on a preset deformation priority (that is, a sequence). The deformation parameter may include a size deformation multiple and a deformation direction. The size deformation multiple may be in a form of horizontal size deformation multiple×vertical size deformation multiple, for example, deformation (2×1) means that a horizontal size becomes twice an original size and a vertical size remains unchanged. A hierarchical order of the size may be: deformation (2×1)>deformation (1×2)>deformation (2×2), and a hierarchical order of the deformation direction may be: right>left, down>up. The deformation may be performed sequentially from the original state to a first state, a second state, a third state, and a fourth state; or may be a cycle, that is, from the original state to the first state, the second state, the third state, the fourth state, and then back to the original state, that is, returning to the original state after at least one deformation.

In this embodiment of this application, the updating a first icon display parameter of the first icon includes: obtaining a first spatial feature of a first region, where the first region is a display region of a preset range including the first icon, and the first spatial feature includes the number of and display positions of vacant icon positions in the first region; determining a deformation fixed point of the first icon based on the first spatial feature; obtaining a preset deformation priority of the first icon; and updating the first icon display parameter of the first icon based on the deformation fixed point, the first spatial feature, and the preset deformation priority. In this way, the icon can be accurately and appropriately controlled for deformation.

The vacant icon position may be an unused desktop region capable of accommodating an icon of preset standard horizontal and vertical dimensions a×a, where a is a non-zero positive number. The preset deformation priority may include a size priority and/or a deformation direction priority.

The preset deformation priority may be set by the electronic device by default, and deformation of icons of application programs installed on the electronic device needs to be performed based on such priority.

For "updating the first icon display parameter of the first icon based on the deformation fixed point, the first spatial feature, and the preset deformation priority", for example, for an application supporting deformation and having sufficient space, the first sign in the lower right corner of the icon may be tapped, that is, the deform control is tapped. In this way, the icon changes in shape using a point as a fixed point. For example, the fixed point may be determined based on spatial conditions in directions around the icon and a deformation direction priority in the preset deformation priority (that is, deformation order priority), where the deformation direction priority in the preset deformation priority may be: deforming to right>deforming to left, deforming downward>deforming upward. The size of deformation may alternatively be performed in an order of size priority of the preset deformation priority, where the size priority of the preset deformation priority may be: deformation (2×1)>deformation (1×2)>deformation (2×2)>deformation (1×1). The size deformation multiple is in the form of horizontal size deformation multiple×vertical size deformation multiple, for example, deformation (2×1) means that the horizontal size becomes twice the original size, and the vertical size remains unchanged.

For example, in a case that the size of the icon is 1a×1a, the deformation controlling sign is tapped, that is, the deform control is tapped, and the icon is first changed to 2a×1a. In this case, if space is available both on right and bottom of the icon, the fixed point is determined to be an upper left corner of the icon. That is, the icon is expanded to right and downward during deformation.

In this embodiment of this application, the number of the first icons is T, and T is greater than 1 (an integer). Before the receiving a first input performed by a user on a first icon, the method further includes: receiving a third input by a user on the T first icons, where each of the T first icons includes a deformation controlling sign; and updating the T first icons to a selected state in response to the third input. The receiving a first input performed by a user on a first icon includes: receiving a first input performed by a user on a deformation controlling sign of a first icon in the T first icons; where the first icon is any one of the T first icons. In this way, batch deformation of desktop icons can be implemented.

Figure 4:
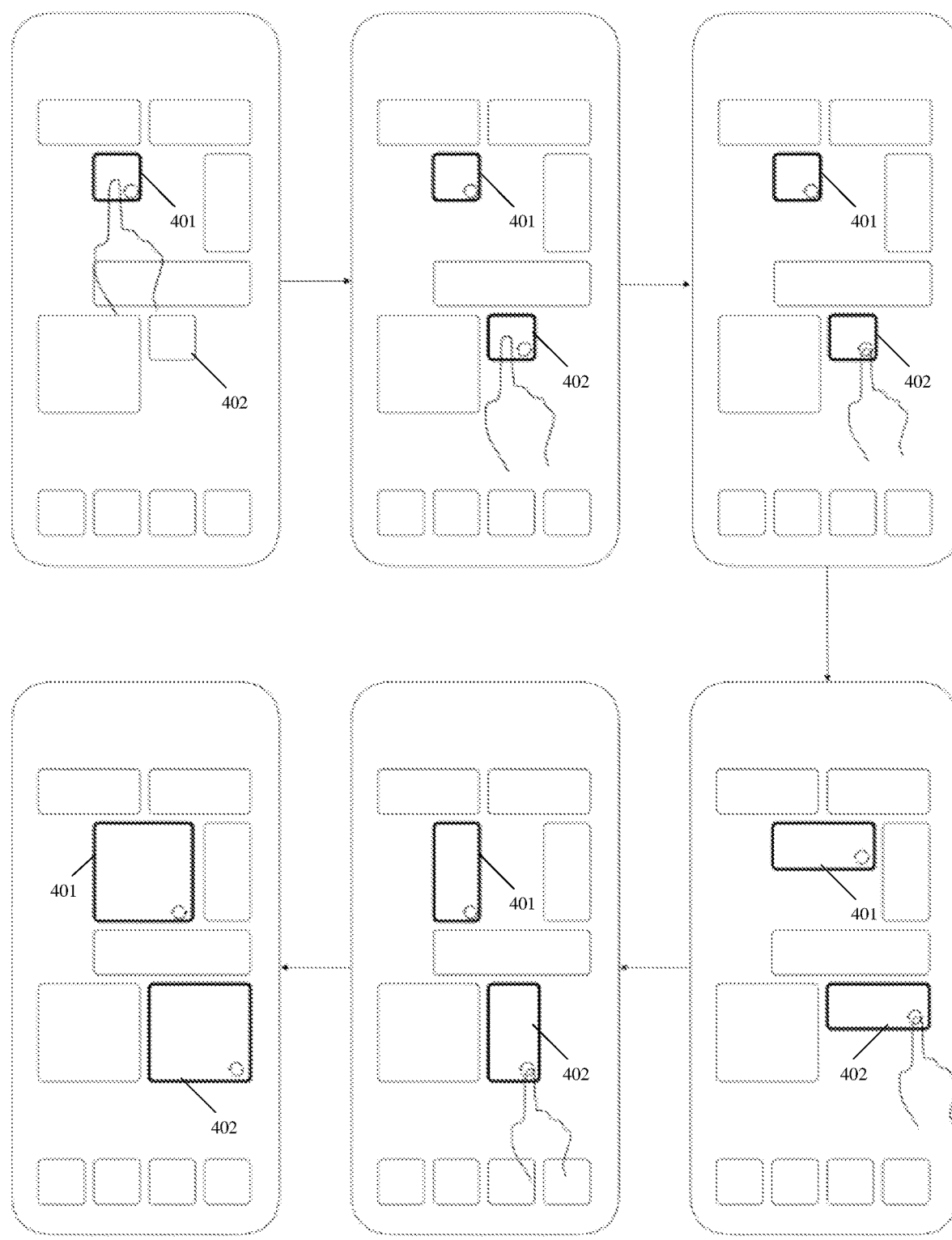
FIG. 4 is a schematic diagram of screens illustrating a batch-icon deformation process according to an embodiment of this application.

For example, for icons of a same size, after a deformation controlling sign appears on the 1st icon, that is, after the deform control appears, other icons can be selected for batch deformation processing. As shown in FIG. 4, after an icon 401 has entered an editing state, batch selection may be performed by tapping another icon 402 of a same size. As shown in the figure, two icons are selected at the same time. A deform control in the lower right corner of any one selected icon is tapped, for example, the icon 402 is tapped, so as to implement simultaneous deformation of a plurality of icons, for example, implementing deformation of the icon 401 and the icon 402 in FIG. 4. For related content about deformation, refer to deformation of the first icon described above. Details are not repeated herein. In addition, when no space for deformation is present for a selected icon, that is, the icon has no space condition for deformation, batch processing may not be performed.

In this embodiment of this application, the first input is an input of dragging the first icon to a first target region, and the first target region includes a display region of a first vacant icon position. The updating a first icon display parameter of the first icon in response to the first input includes: obtaining an icon position display parameter of the first vacant icon position; and updating the first icon display parameter of the first icon based on the icon position display parameter. After the receiving a first input performed by a user on a first icon, the method further includes: displaying the first icon in the first target region; where the updated first icon display parameter is the same as the icon position display parameter, and the icon position display parameter includes at least one of the following: shape or display size. In this way, adaptive deformation can be implemented after the icon is moved to a position. For example, the icon may be moved to a vacant icon position and deformed. Deformation means updating the icon display parameter of the icon.

The "updating the first icon display parameter of the first icon based on the icon position display parameter" may be understood as adjusting the first icon to an icon adapted to the icon position display parameter. That is, the first icon display parameter of the first icon after adjustment is the same as the icon position display parameter of the first vacant icon position.

For example, in a case that the first icon is not allowed to place in the display region of the first vacant icon position, the electronic device may determine, based on icon position display parameters of all current vacant icon position, a position for placing the first icon, and accordingly adjusts the first icon display parameter.

In addition, during movement, in a case that the first icon is not allowed to place in the display region of the first vacant icon position, that is, a space position does not permit, the first icon may be moved according to a rule of "squeeze". To be specific, the icon being moved is placed at a target position including the first vacant icon position, and an icon originally located at the target position is moved to another icon position, that is, the icon in the target position is "squeezed out". That is, the corresponding first target region includes a display region of a fourth icon. The first icon is displayed in the first target region, and the fourth icon is moved to a seventh target region. For example, the fourth icon in the preset position range of the display region of the first vacant icon position is moved to a position outside the preset position range. Then, whether placement of the first icon is supported is determined based on the preset position range, and the first icon is moved to the target position in a case that placement is supported.

Optionally, during an input process of the first input, the method further includes: displaying an icon position prompt sign in the first target region, where the icon position prompt sign is used to indicate a shape and a size of the first vacant icon position. This can help the user to quickly learn about the shape and the size of the icon obtained through deformation.

"During an input process of the first input" may be in a process in which the user drags the first icon, and this process includes an entire process from starting to drag to staying in the target region.

The icon position prompt sign may be understood as position preview. The icon position prompt sign may be embodied as a sign including a contour, such as a graph or a pattern.

Figure 5:
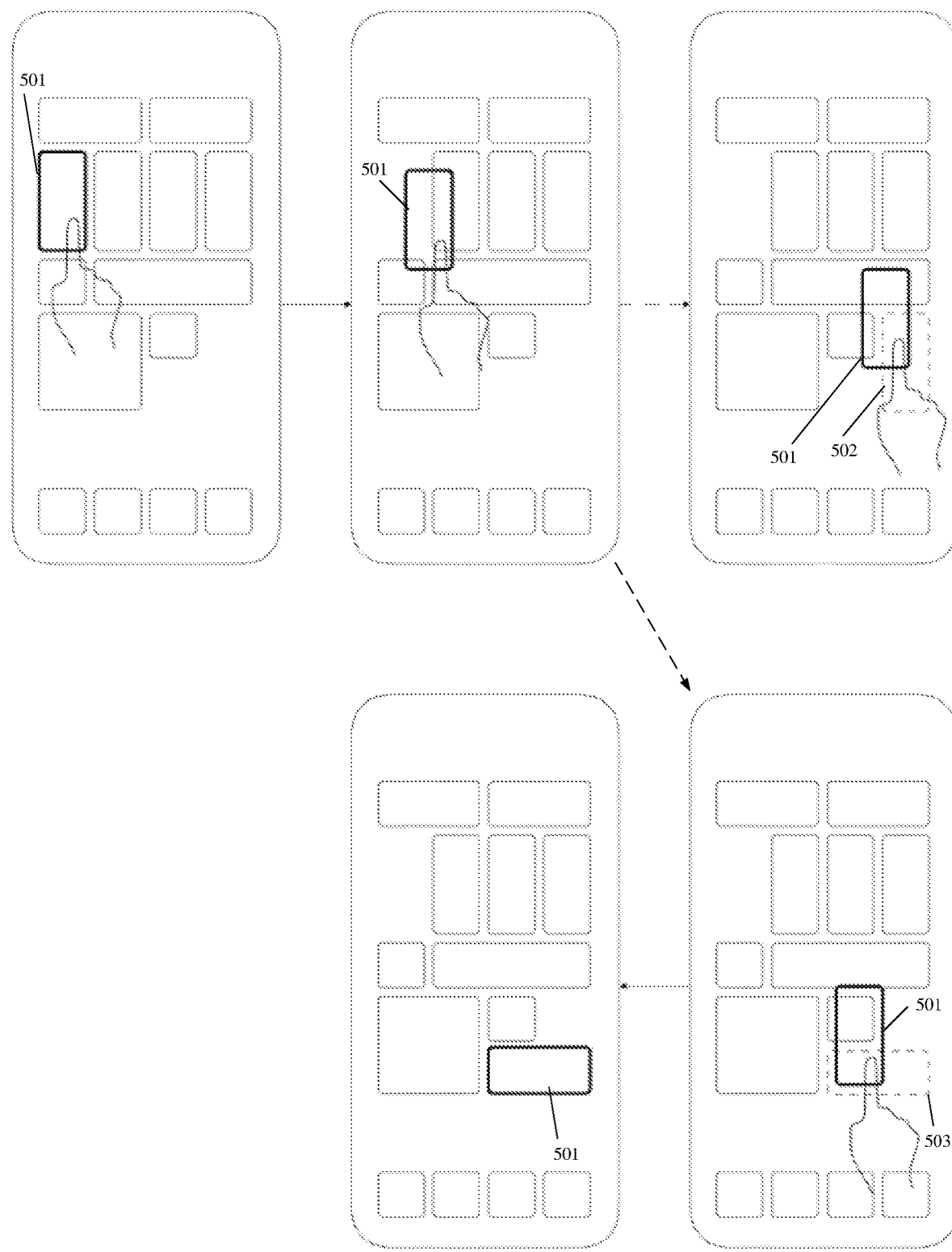
FIG. 5 is a second schematic diagram of screens illustrating a deformation process of a first icon according to an embodiment of this application.

For adaptation to the shape and the size of the icon during movement, in the process of moving the icon, the shape and the size of the icon may be adapted based on a space condition of a destination for moving the icon. As shown in FIG. 5, the user may tap and hold a desktop icon 501 with horizontal and vertical dimensions 1a×2a, and then holds to move the icon. For the selected target position, there are two cases. Case 1: moving to a vacant position 502 of a same size, where a position preview appears, indicating that being placed at the position is allowed. Case 2: moving to a vacant position 503 of a different size (for example, horizontal and vertical dimensions of the icon are 2a×1a), where if being placed in this region is allowed, a position preview appears, indicating that being placed at the position is allowed, and switching from the icon horizontal and vertical dimensions of both (1a×2a) and (2a×1a) to the icon horizontal and vertical dimensions 1a×1a is supported. Then, after the user releases the finger, placement can be completed.

In addition, for the icon with original-icon horizontal and vertical dimensions 1a×2a, the user may tap and hold the icon to drag. When the icon is moved to the target position, if the electronic device provides a position preview based on the target position information, that is, based on information about current vacant positions, it indicates that being placed at the position is allowed. The shape of the icon may remain unchanged preferentially. However, when there is not sufficient space in the target position to keep the original shape of the icon unchanged, position adaptation may be automatically performed based on the information about current vacant positions, and the shape and the size of the icon are also adjusted. Icons whose horizontal and vertical dimensions are 1a×2a and 2a×1a can be switched to one other, all supporting switching to 1a×1a.

Figure 6:
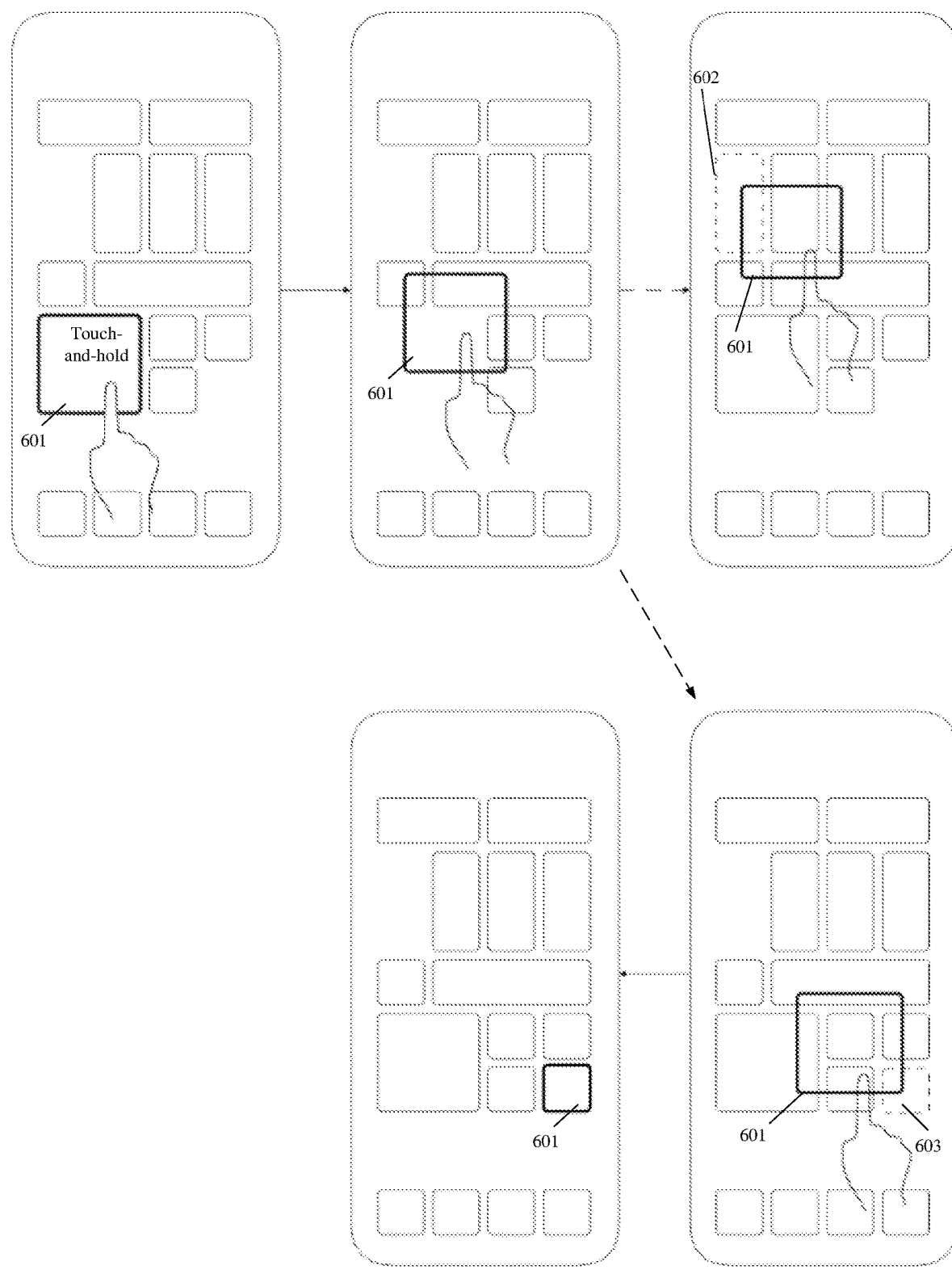
FIG. 6 is a third schematic diagram of screens illustrating a deformation process of a first icon according to an embodiment of this application.

In addition, as shown in FIG. 6, the user may tap and hold a desktop icon 601 whose horizontal and vertical dimensions are 2a×2a; holds to move the icon; and then selects a target position (horizontal and vertical dimensions of an icon corresponding to the position may be 1a×2a or 2a×1a): 1. a position preview appears when the icon is moved to a vacant position with a same size, indicating that being placed at the position is allowed; 2. when the icon is moved to a vacant position 602 or 603 of a different size, whether placement is allowed may be determined according to a reduction rule; 3. for example, the reduction rule may be supporting automatic switching from icon horizontal and vertical dimensions 2a×2a to icon horizontal and vertical dimensions 1a×2a, 2a×1a, or 1a×1a; 4. If placement is not allowed, a preview is not displayed. Supposing that a target position (whose corresponding icon horizontal and vertical dimensions are 1a×1a) is selected, if placement at this position is allowed, the user completes icon movement by releasing the finger; or if placement at this position is not allowed, the icon is returned to its original position after the user releases the finger.

That is, for the icon with original-icon horizontal and vertical dimensions 2a×2a, the user may tap and hold the icon to drag. When the icon is moved to the target position, the electronic device may provide a position preview based on the information about current vacant positions. The shape of the icon may remain unchanged preferentially. However, when there is not sufficient space in the target position to keep the original shape of the icon unchanged, position adaptation may be automatically performed based on the information about current vacant positions, and the shape and the size of the icon are also adjusted. Switching from icon horizontal and vertical dimensions 2a×2a to icon horizontal and vertical dimensions 1a×2a, 2a×1a, and 1a×1a is supported. After the user releases the finger, icon placement is completed based on the position preview; or if the spatial condition of the position does not permit placement, the icon is put back to its original position.

In this embodiment of this application, the first input is an input of dragging the first icon to a second target region, and the second target region includes a display region of a second icon; and the updating a first icon display parameter of the first icon in response to the first input includes: obtaining a second icon display parameter of the second icon; and updating the first icon display parameter of the first icon based on the second icon display parameter; where the updated first icon display parameter is the same as the second icon display parameter, and the second icon display parameter includes at least one of the following: shape or display size. In this way, icon deformation can be implemented in a manner of duplication and deformation (moving one icon to another icon). The duplication and deformation in this embodiment of this application can be triggered by moving the first icon to the second icon, and the first icon is deformed based on the icon display parameter of the second icon.

The "updating the first icon display parameter of the first icon based on the second icon display parameter" may be understood as adjusting the first icon to an icon adapted to the second icon display parameter. That is, the first icon display parameter of the first icon after adjustment is the same as the second icon display parameter.

Optionally, after the receiving a first input performed by a user on a first icon, the method further includes at least one of the following:

(1) In a case that a duration of the first icon staying in the second target region is greater than a preset threshold and a fourth input performed by a user on the first icon is received, moving the updated first icon to a third target region; where the fourth input is an input of dragging the updated first icon to the third target region.

For example, the third target region may be a region different from the second target region, a region the same as the first target region, or another vacant icon position different from the first target region.

(2) In a case that a fourth input performed by a user on the first icon is not received within a preset time period, moving the first icon to a fourth target region, where the fourth target region is a display region of a second vacant icon position.

For example, after duplication and deformation are completed, the deformed icon is placed directly at the last position of the screen, so as not to affect other icons. That is, an icon A is moved to an icon B and stays still, being deformed to a shape and a size the same as those of the icon B and then moved to another vacant position.

(3) In a case that a fourth input performed by a user on the first icon is not received within a preset time period, moving the first icon to a fifth target region, or displaying the first icon in the second target region and moving the second icon to a sixth target region; where the fifth target region is a display position of the first icon before the first input is received, and the sixth target region includes the fifth target region, a display region of a third vacant icon position, or a display region of a third icon.

That is, the first icon after duplication and deformation may be placed in the original position, and other icons may be moved, for example, a movement order may be moving the last one to the 1st position of the next row, or moving the last one to a position of a corresponding column in the next row. The "moving the first icon to a fifth target region" may be: moving an icon within the preset position range of the fifth target region to a position outside the preset position range, returning to determine, based on the preset position range, whether an operation of placing the first icon is supported, and finally moving the first icon to the target position in a case that placement is supported.

The "displaying the first icon in the second target region and moving the second icon to a sixth target region" may be exchanging positions of the second icon and the first icon, or sequentially moving the second icon. The sequentially moving may be moving the second icon to a vacant icon position or to a position of another icon.

With the foregoing operations, the first icon after duplication and deformation can be placed in a plurality of positions, so as to meet personalized needs of a user.

Figure 7:
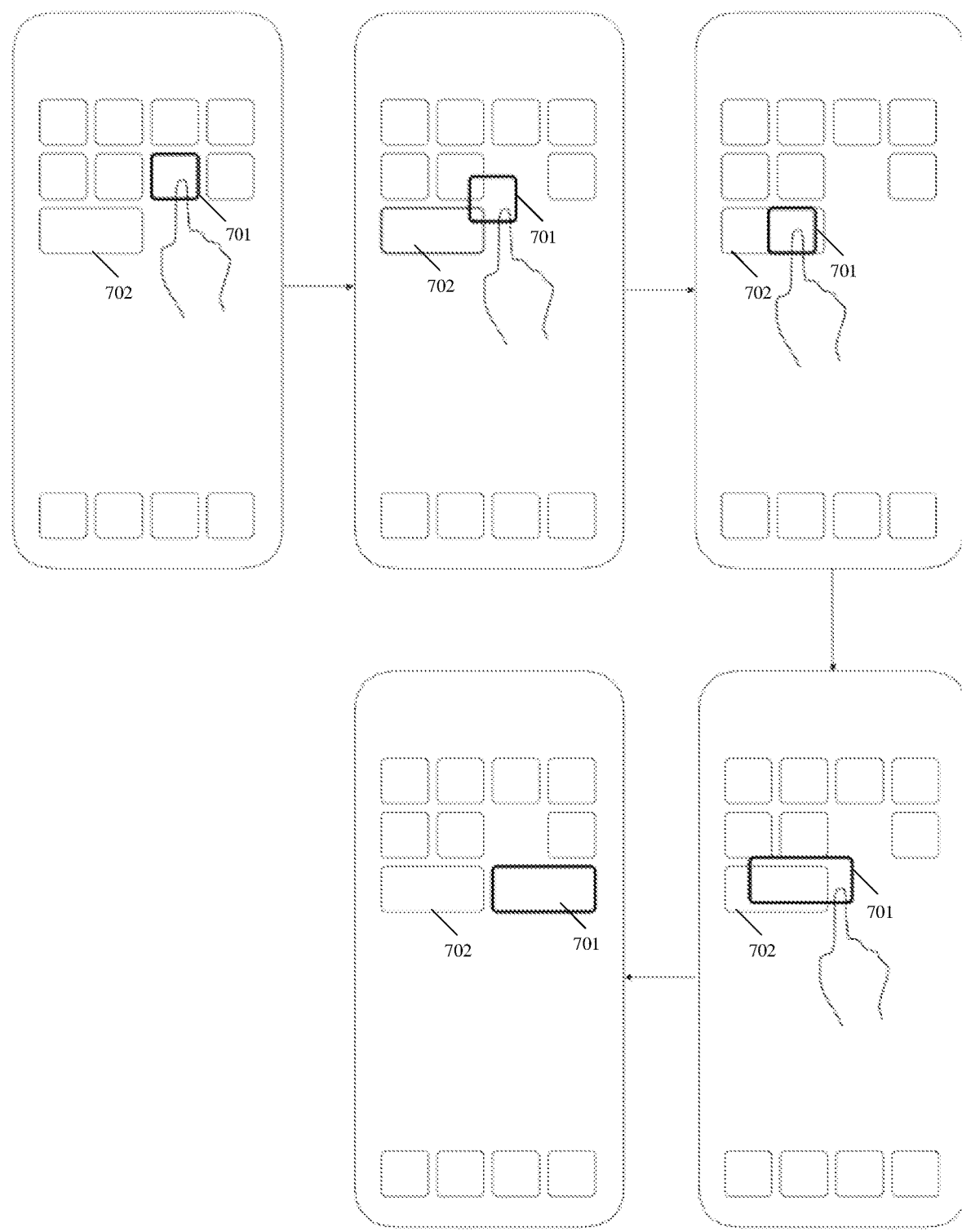
FIG. 7 is a fourth schematic diagram of screens illustrating a deformation process of a first icon according to an embodiment of this application.

For the foregoing icon duplication and deformation, as shown in FIG. 7, touch-and-hold may be performed on an icon 701 supporting deformation, so as to enter a setting state. The user may drag the icon 701 to another icon 702 and keep still for a preset duration such as 3 s. In this case, the icon 701 copies the shape and the size of another icon 702. After duplication, the size and shape of the icon 701 are the same as the size and shape of the copied icon 702. Subsequently, the user continues to drag the icon, to move the deformed icon to a position.

In addition, during movement, in a case that there is no space for deformation, that is, a space position does not permit, the foregoing rule of "squeeze" can be used to place the being-moved icon to the target position, so as to "squeeze out" an original icon at this position, that is, moving the icon at this position to another position.

Optionally, after the receiving a first input performed by a user on a first icon, the method further includes: obtaining a second icon theme parameter of the second icon; and adjusting the first icon theme parameter of the first icon based on the second icon theme parameter; where the updated first icon theme parameter matches the second icon theme parameter, and the first icon theme parameter includes at least one parameter other than the first icon display parameter. In this way, more deformations of the first icon other than the size and shape can be implemented.

The first icon theme parameter may include icon theme feature parameters such as color and transparency, which is not limited herein.

It can be learned from the foregoing that in the solution provided in this embodiment of this application, the user may be free from a shape restriction of a square on the premise that the space permits and the application supports icon deformation, so as to adjust a dimension ratio of the icon and the size of the icon. During icon movement, the shape and the size of the icon can be automatically adapted based on the attributes of the icon itself and a space condition of the target position.

Therefore, the icons can be enlarged for display, making it easier to find high-frequency applications; the desktop form can be changed to make desktop icons displayed in a more layered manner; and icons of desktop applications can be managed and set in more dimensions to improve diversity of desktop layouts and meet individual needs of users.

According to the icon display control method provided in this embodiment of this application, the first input performed by a user on the first icon is received, and the first icon display parameter of the first icon is updated in response to the first input; where the first icon display parameter includes at least one of the following: shape or display size. In this way, display of the icon can be adjusted, and the user can adjust a display parameter of the icon before moving the icon. Because the display shape and display size of the icon can be adjusted flexibly, a success probability of moving icons by a user can be improved and user operations can be simplified.

It should be noted that, for the icon display control method provided in the embodiments of this application, the execution body may be an icon display control apparatus, or a control module for executing the icon display control method in the icon display control apparatus. In the embodiments of this application, the icon display control apparatus provided in the embodiments of this application is described by using the icon display control method being executed by the icon display control apparatus as an example.

Figure 8:
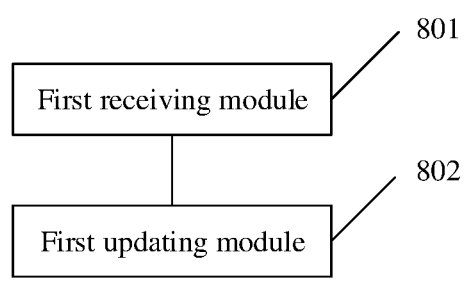
FIG. 8 is a schematic structural diagram of an icon display control apparatus according to an embodiment of this application.

An embodiment of this application further provides an icon display control apparatus, as shown in FIG. 8, including:

a first receiving module 801, configured to receive a first input performed by a user on a first icon; and a first updating module 802, configured to update a first icon display parameter of the first icon in response to the first input; where the first icon display parameter includes at least one of the following: shape or display size.

Optionally, the apparatus further includes: a second receiving module, configured to receive a second input performed by a user on the first icon before the first input performed by a user on the first icon is received; a first obtaining module, configured to obtain an icon redrawing attribute of the first icon and an icon adjustability attribute of the first icon in response to the second input; a first determining module, configured to determine a deformation controlling sign of the first icon based on the icon redrawing attribute and the icon adjustability attribute; and a first display module, configured to display the deformation controlling sign in a preset region of the first icon. The first receiving module includes: a first receiving submodule, configured to receive a first input performed by a user on the deformation controlling sign.

The icon redrawing attribute includes the first redrawing attribute and the second redrawing attribute, the first redrawing attribute is icon redrawing being supported by a program corresponding to the first icon, and the second redrawing attribute is the icon redrawing being not supported by the program corresponding to the first icon. The icon adjustability attribute includes the first adjustability attribute and the second adjustability attribute, the first adjustability attribute is a space for deformation of the first icon being present in a display region of a preset range including the first icon, and the second adjustability attribute is the space for deformation of the first icon being absent in the display region of the preset range including the first icon. The space for deformation space of the first icon being present includes: at least one vacant icon position being present.

The first determining module includes: a first determining submodule, configured to: in a case that the icon redrawing attribute is the first redrawing attribute and the icon adjustability attribute is the first adjustability attribute, determine a first sign as the deformation controlling sign of the first icon, where the first sign indicates that the first icon supports deformation and that a space for deformation is present; in a case that the icon redrawing attribute is the first redrawing attribute and the icon adjustability attribute is the second adjustability attribute, determine a second sign as the deformation controlling sign of the first icon, where the second sign indicates that the first icon supports deformation and that no space for deformation is present; or in a case that the icon redrawing attribute is the second redrawing attribute, determine a third sign as the deformation controlling sign of the first icon, where the third sign indicates that the first icon does not support deformation. The first updating module includes: a first updating submodule, configured to: in a case that the deformation controlling sign of the first icon is the first sign, update the first icon display parameter of the first icon.

In this embodiment of this application, the first updating module includes: a first obtaining submodule, configured to obtain a first spatial feature of a first region, where the first region is a display region of a preset range including the first icon, and the first spatial feature includes the number of and display positions of vacant icon positions in the first region; a second determining submodule, configured to determine a deformation fixed point of the first icon based on the first spatial feature; and a second obtaining submodule, configured to obtain a preset deformation priority of the first icon; and update the first icon display parameter of the first icon based on the deformation fixed point, the first spatial feature, and the preset deformation priority.

The number of first icons is T, and T is greater than 1. The apparatus further includes: a third receiving module, configured to: before the first input performed by a user on the first icon is received, receive a third input by a user on the T first icons, where each of the T first icons includes a deformation controlling sign; and a second updating module, configured to update the T first icons to a selected state in response to the third input. The first receiving module includes: a second receiving submodule, configured to receive a first input performed by a user on a deformation controlling sign of a first icon in the T first icons; where the first icon is any one of the T first icons.

In this embodiment of this application, the first input is an input of dragging the first icon to a first target region, and the first target region includes a display region of a first vacant icon position. The first updating module includes: a third obtaining submodule, configured to obtain an icon position display parameter of the first vacant icon position; and a second updating submodule, configured to update the first icon display parameter of the first icon based on the icon position display parameter. The apparatus further includes: a second display module, configured to: after the first input performed by a user on the first icon is received, display the first icon in the first target region; where the updated first icon display parameter is the same as the icon position display parameter, and the icon position display parameter includes at least one of the following: shape or display size.

Optionally, the apparatus further includes: a third display module, configured to: during an input process of the first input, display an icon position prompt sign in the first target region, where the icon position prompt sign is used to indicate a shape and a size of the first vacant icon position.

The first input is an input of dragging the first icon to a second target region, and the second target region includes a display region of a second icon; and the first updating module includes: a fourth obtaining submodule, configured to obtain a second icon display parameter of the second icon; and a third updating submodule, configured to update the first icon display parameter of the first icon based on the second icon display parameter; where the updated first icon display parameter is the same as the second icon display parameter, and the second icon display parameter includes at least one of the following: shape or display size.

Optionally, the apparatus further includes at least one of the following: (1) a first processing module, configured to: after the first input performed by a user on the first icon is received, in a case that a duration of the first icon staying in the second target region is greater than a preset threshold and a fourth input performed by a user on the first icon is received, move the updated first icon to a third target region; where the fourth input is an input of dragging the updated first icon to the third target region; (2) a second processing module, configured to: after the first input performed by a user on the first icon is received, in a case that a fourth input performed by a user on the first icon is not received within a preset time period, move the first icon to a fourth target region, where the fourth target region is a display region of a second vacant icon position; or (3) a third processing module, configured to: after the first input performed by a user on the first icon is received, in a case that a fourth input performed by a user on the first icon is not received within a preset time period, move the first icon to a fifth target region, or display the first icon in the second target region and move the second icon to a sixth target region; where the fifth target region is a display position of the first icon before the first input is received, and the sixth target region includes the fifth target region, a display region of a third vacant icon position, or a display region of a third icon.

Optionally, the apparatus further includes: a second obtaining module, configured to: after the first input performed by a user on the first icon is received, obtain a second icon theme parameter of the second icon; and a first adjustment module, configured to adjust the first icon theme parameter of the first icon based on the second icon theme parameter; where the updated first icon theme parameter matches the second icon theme parameter, and the first icon theme parameter includes at least one parameter other than the first icon display parameter.

The icon display control apparatus provided in this embodiment of this application receives the first input performed by a user on the first icon, and updates the first icon display parameter of the first icon in response to the first input; where the first icon display parameter includes at least one of the following: shape or display size. In this way, display of the icon can be adjusted, and the user can adjust a display parameter of the icon before moving the icon. Because the display shape and display size of the icon can be adjusted flexibly, a success probability of moving icons by a user can be improved and user operations can be simplified.

The icon display control apparatus in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network-attached storage (NAS), a personal computer (PC), a television (TV), a teller machine, a self-service machine, or the like. This is not specifically limited in the embodiments of this application.

The icon display control apparatus in this embodiment of this application may be an apparatus with an operating system. The operating system may be an Android operating system, an iOS operating system, or other possible operating systems, and is not specifically limited in the embodiments of this application.

The icon display control apparatus provided in this embodiment of this application is capable of implementing the processes that are implemented by the method embodiments in FIG. 1 to FIG. 7. To avoid repetition, details are not described herein again.

Figure 9:
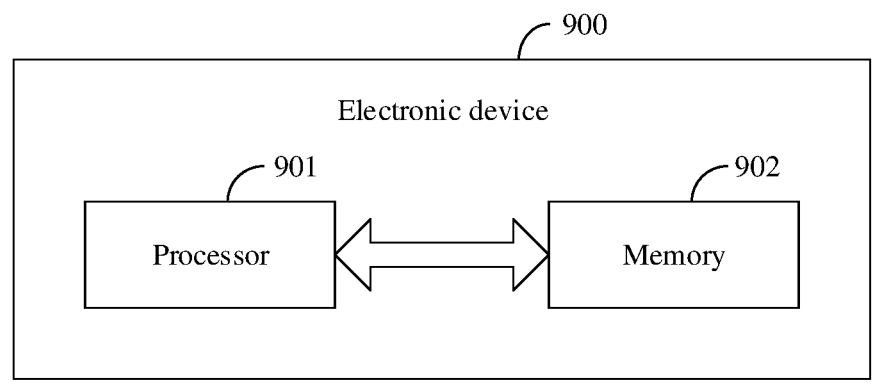
FIG. 9 is a first schematic structural diagram of an electronic device according to an embodiment of this application.

Optionally, as shown in FIG. 9, an embodiment of this application further provides an electronic device 900, including a processor 901, a memory 902, and a program or instructions stored in the memory 902 and executable on the processor 901. When the program or the instructions are executed by the processor 901, the processes of the foregoing embodiment of the icon display control method are implemented, with the same technical effects achieved. To avoid repetition, details are not described herein again.

It should be noted that the electronic device in this embodiment of this application includes the aforementioned mobile electronic device and non-mobile electronic device.

Figure 10:
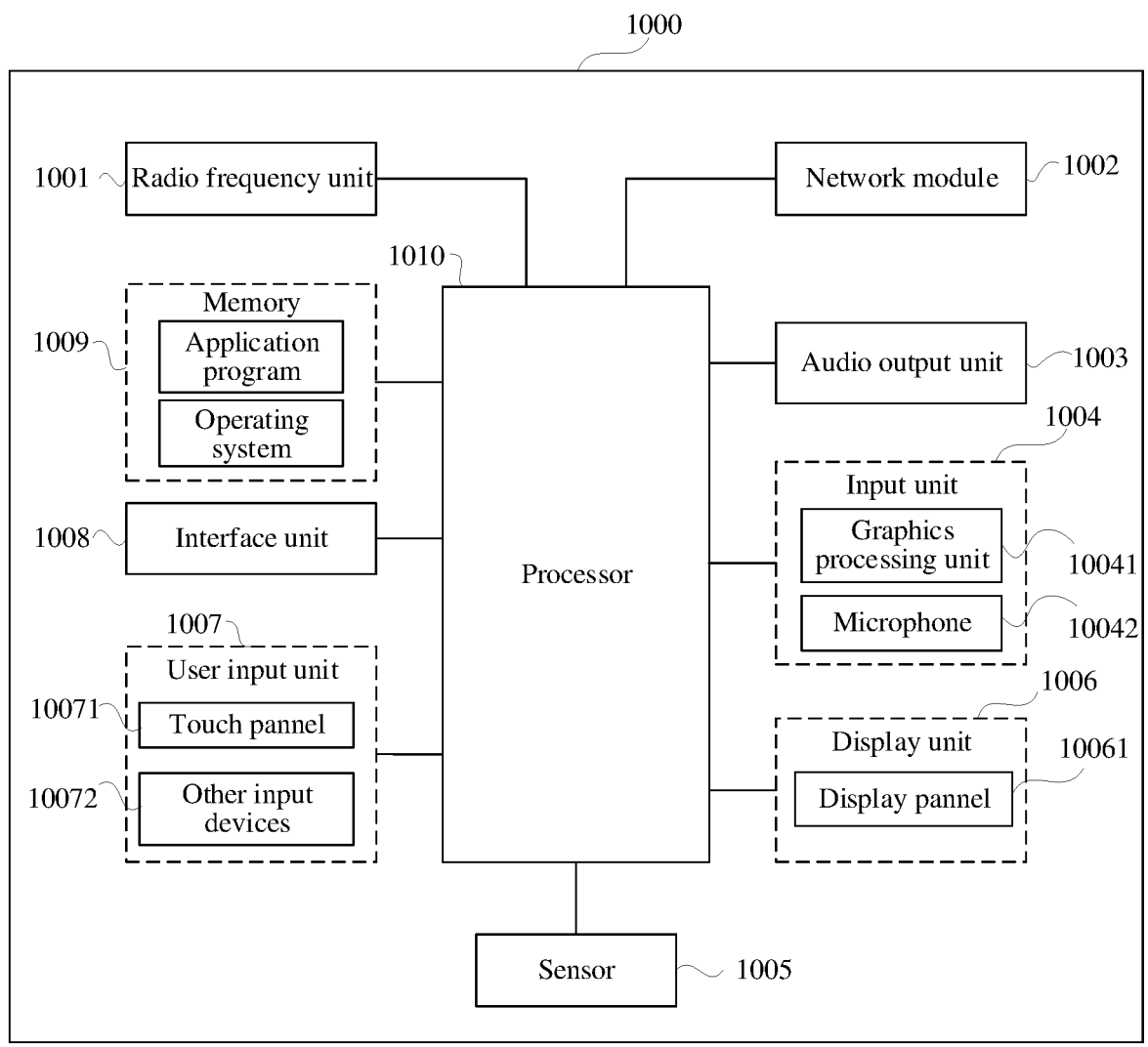
FIG. 10 is a second schematic structural diagram of an electronic device according to an embodiment of this application.

FIG. 10 is a schematic diagram of a hardware structure of an electronic device for implementing the embodiments of this application.

The electronic device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understand that the electronic device 1000 may further include a power supply (for example, a battery) supplying power to all components, and the power supply may be logically connected to the processor 1010 through a power management system. In this way, functions such as charge management, discharge management, and power consumption management are implemented by using the power management system. The structure of the electronic device shown in FIG. 10 does not constitute any limitation on the electronic device. The electronic device may include more or fewer components than shown in the figure, or a combination of some components, or the components disposed differently. Details are not repeated herein.

The user input unit 1007 is configured to receive a first input performed by a user on a first icon.

The processor 1010 is configured to update a first icon display parameter of the first icon in response to the first input.

The first icon display parameter includes at least one of the following: shape or display size.

According to the icon display control method provided in this embodiment of this application, the first input performed by a user on the first icon is received, and the first icon display parameter of the first icon is updated in response to the first input; where the first icon display parameter includes at least one of the following: shape or display size. In this way, display of the icon can be adjusted, and the user can adjust a display parameter of the icon before moving the icon. Because the display shape and display size of the icon can be adjusted flexibly, a success probability of moving icons by a user can be improved and user operations can be simplified.

Optionally, the user input unit 1007 is further configured to receive a second input performed by a user on the first icon before the first input performed by a user on the first icon is received.

The processor 1010 is further configured to obtain an icon redrawing attribute of the first icon and an icon adjustability attribute of the first icon in response to the second input, and determine a deformation controlling sign of the first icon based on the icon redrawing attribute and the icon adjustability attribute.

The display unit 1006 is configured to display the deformation controlling sign in a preset region of the first icon.

The user input unit 1007 is configured to receive a first input performed by a user on the deformation controlling sign.

Optionally, the icon redrawing attribute includes the first redrawing attribute and the second redrawing attribute, the first redrawing attribute is icon redrawing being supported by a program corresponding to the first icon, and the second redrawing attribute is the icon redrawing being not supported by the program corresponding to the first icon. The icon adjustability attribute includes the first adjustability attribute and the second adjustability attribute, the first adjustability attribute is a space for deformation of the first icon being present in a display region of a preset range including the first icon, and the second adjustability attribute is the space for deformation of the first icon being absent in the display region of the preset range including the first icon. The space for deformation of the first icon being present includes: at least one vacant icon position being present.

Optionally, the processor 1010 is configured to: in a case that the icon redrawing attribute is the first redrawing attribute and the icon adjustability attribute is the first adjustability attribute, determine a first sign as the deformation controlling sign of the first icon, where the first sign indicates that the first icon supports deformation and that a space for deformation is present; in a case that the icon redrawing attribute is the first redrawing attribute and the icon adjustability attribute is the second adjustability attribute, determine a second sign as the deformation controlling sign of the first icon, where the second sign indicates that the first icon supports deformation and that no space for deformation is present; or in a case that the icon redrawing attribute is the second redrawing attribute, determine a third sign as the deformation controlling sign of the first icon, where the third sign indicates that the first icon does not support deformation.

The processor 1010 is configured to: in a case that the deformation controlling sign of the first icon is the first sign, update the first icon display parameter of the first icon.

Optionally, the processor 1010 is configured to obtain a first spatial feature of a first region, where the first region is a display region of a preset range including the first icon, and the first spatial feature includes the number of and display positions of vacant icon positions in the first region; determine a deformation fixed point of the first icon based on the first spatial feature; obtain a preset deformation priority of the first icon; and update the first icon display parameter of the first icon based on the deformation fixed point, the first spatial feature, and the preset deformation priority.

Optionally, the number of first icons is T, and T is greater than 1.

The user input unit 1007 is further configured to: before the first input performed by a user on the first icon is received, receive a third input by a user on the T first icons, where each of the T first icons includes a deformation controlling sign.

The processor 1010 is configured to update the T first icons to a selected state in response to the third input.

The user input unit 1007 is configured to: receive a first input performed by a user on a deformation controlling sign of a first icon in the T first icons; where the first icon is any one of the T first icons.

Optionally, the first input is an input of dragging the first icon to a first target region, and the first target region includes a display region of a first vacant icon position.

The processor 1010 is configured to: obtain an icon position display parameter of the first vacant icon position; and update the first icon display parameter of the first icon based on the icon position display parameter.

The display unit 1006 is further configured to: after the first input performed by a user on the first icon is received, display the first icon in the first target region; where the updated first icon display parameter is the same as the icon position display parameter, and the icon position display parameter includes at least one of the following: shape or display size.

Optionally, the display unit 1006 is further configured to: during an input process of the first input, display an icon position prompt sign in the first target region, where the icon position prompt sign is used to indicate a shape and a size of the first vacant icon position.

Optionally, the first input is an input of dragging the first icon to a second target region, and the second target region includes a display region of a second icon.

The processor 1010 is configured to: obtain a second icon display parameter of the second icon; and update the first icon display parameter of the first icon based on the second icon display parameter; where the updated first icon display parameter is the same as the second icon display parameter, and the second icon display parameter includes at least one of the following: shape or display size.

Optionally, after the first input performed by a user on the first icon is received, the processor 1010 is further configured to perform at least one of the following:

in a case that a duration of the first icon staying in the second target region is greater than a preset threshold and a fourth input performed by a user on the first icon is received, moving the updated first icon to a third target region; where the fourth input is an input of dragging the updated first icon to the third target region;

in a case that a fourth input performed by a user on the first icon is not received within a preset time period, moving the first icon to a fourth target region, where the fourth target region is a display region of a second vacant icon position; or in a case that a fourth input performed by a user on the first icon is not received within a preset time period, moving the first icon to a fifth target region, or displaying the first icon in the second target region and moving the second icon to a sixth target region; where the fifth target region is a display position of the first icon before the first input is received, and the sixth target region includes the fifth target region, a display region of a third vacant icon position, or a display region of a third icon.

Optionally, the processor 1010 is further configured to: after the first input performed by a user on the first icon is received, obtain a second icon theme parameter of the second icon; and adjust the first icon theme parameter of the first icon based on the second icon theme parameter; where the updated first icon theme parameter matches the second icon theme parameter, and the first icon theme parameter includes at least one parameter other than the first icon display parameter.

According to the solution provided in this embodiment of this application, the icons can be enlarged for display, making it easier to find high-frequency applications; the desktop form can be changed to make desktop icons displayed in a more layered manner; and icons of desktop applications can be managed and set in more dimensions to improve diversity of desktop layouts and meet individual needs of users.

It can be understood that in this embodiment of this application, the input unit 1004 may include a graphics processing unit (GPU) 10041 and a microphone 10042. The graphics processing unit 10041 processes image data of a still picture or video obtained by an image capture apparatus (such as a camera) in a video capture mode or an image capture mode. The display unit 1006 may include a display panel 10061, and the display panel 10061 may be configured in a form of a liquid crystal display, an organic light-emitting diode, and the like. The user input unit 1007 may include a touch panel 10071 and other input devices 10072. The touch panel 10071 is also referred to as a touchscreen. The touch panel 10071 may include two parts: a touch detection apparatus and a touch controller. The other input devices 10072 may include but are not limited to a physical keyboard, a function key (such as a volume control key or a power on/off key), a trackball, a mouse, a joystick, and the like. Details are not described herein. The memory 1009 may be configured to store software programs and various data, including but not limited to application programs and an operating system. The processor 1010 may integrate an application processor and a modem processor, where the application processor mainly processes the operating system, user interfaces, application programs, and the like, and the modem processor mainly processes wireless communication. It can be understood that the modem processor may alternatively be not integrated in the processor 1010.

An embodiment of this application further provides a non-transitory readable storage medium, where a program or instructions are stored in the non-transitory readable storage medium. When the program or the instructions are executed by a processor, the processes of the foregoing embodiment of the icon display control method are implemented, with the same technical effects achieved. To avoid repetition, details are not described herein again.

The processor is a processor in the electronic device described in the foregoing embodiments. The non-transitory readable storage medium includes a non-transitory computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions to implement the processes of the foregoing embodiments of the icon display control method, with the same technical effects achieved. To avoid repetition, details are not described herein again.

It should be understood that the chip mentioned in the embodiments of this application may also be referred to as a system-level chip, a system chip, a chip system, a system-on-chip, or the like.

It may be understood that the embodiments described in this disclosure may be implemented by hardware, software, firmware, middleware, microcode, or a combination thereof. For hardware implementation, a module, a unit, a submodule, a subunit, and the like may be implemented in one or more application specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, and other electronic units for performing the functions described in this application, or a combination thereof.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An icon display control method, comprising:
receiving a third input by a user on T first icons, wherein each of the T first icons comprises a deformation controlling sign;
updating the T first icons to a selected state in response to the third input;
receiving a first input performed by the user on a first icon; wherein a number of first icons is T, and T is greater than 1; and
updating a first icon display parameter of the first icon in response to the first input; wherein
the first icon display parameter comprises at least one of: shape or display size; wherein
the receiving the first input performed by the user on the first icon comprises:
receiving a first input performed by the user on a deformation controlling sign of a first icon in the T first icons; wherein
the first icon is any one of the T first icons.

2. The method according to claim 1, wherein before the receiving the first input performed by the user on the first icon, the method further comprises:
receiving a second input performed by a user on the first icon;
obtaining an icon redrawing attribute of the first icon and an icon adjustability attribute of the first icon in response to the second input;
determining the deformation controlling sign of the first icon based on the icon redrawing attribute and the icon adjustability attribute; and
displaying the deformation controlling sign in a preset region of the first icon.

3. The method according to claim 2, wherein the icon redrawing attribute comprises a first redrawing attribute and a second redrawing attribute, the first redrawing attribute is icon redrawing being supported by a program corresponding to the first icon, and the second redrawing attribute is the icon redrawing being not supported by the program corresponding to the first icon; and
the icon adjustability attribute comprises a first adjustability attribute and a second adjustability attribute, the first adjustability attribute is a space for deformation of the first icon being present in a display region of a preset range comprising the first icon, and the second adjustability attribute is the space for deformation of the first icon being absent in the display region of the preset range comprising the first icon; wherein the space for deformation of the first icon being present comprises: at least one vacant icon position being present.

4. The method according to claim 3, wherein the determining the deformation controlling sign of the first icon based on the icon redrawing attribute and the icon adjustability attribute comprises:

in a case that the icon redrawing attribute is the first redrawing attribute and the icon adjustability attribute is the first adjustability attribute, determining a first sign as the deformation controlling sign of the first icon, wherein the first sign indicates that the first icon supports deformation and that a space for deformation is present;
in a case that the icon redrawing attribute is the first redrawing attribute and the icon adjustability attribute is the second adjustability attribute, determining a second sign as the deformation controlling sign of the first icon, wherein the second sign indicates that the first icon supports deformation and that no space for deformation is present; or
in a case that the icon redrawing attribute is the second redrawing attribute, determining a third sign as the deformation controlling sign of the first icon, wherein the third sign indicates that the first icon does not support deformation; and
the updating the first icon display parameter of the first icon comprises:
in a case that the deformation controlling sign of the first icon is the first sign, updating the first icon display parameter of the first icon.

5. An electronic device, comprising a processor, a memory, and a program or instructions stored in the memory and executable on the processor, wherein the program or the instructions, when executed by the processor, cause the electronic device to perform following steps:
receiving a third input by a user on T first icons, wherein each of the T first icons comprises a deformation controlling sign;
updating the T first icons to a selected state in response to the third input;
receiving a first input performed by the user on a first icon; wherein a number of first icons is T, and T is greater than 1; and
updating a first icon display parameter of the first icon in response to the first input; wherein
the first icon display parameter comprises at least one of: shape or display size; wherein
in the process of receiving the first input performed by the user on the first icon by the electronic device, the program or the instructions, when executed by the processor, cause the electronic device to perform following step:
receiving a first input performed by a user on a deformation controlling sign of a first icon in the T first icons; wherein
the first icon is any one of the T first icons.

6. The electronic device according to claim 5, wherein before the receiving the first input performed by the user on the first icon, the program or the instructions, when executed by the processor, cause the electronic device to further perform following steps:
receiving a second input performed by a user on the first icon;
obtaining an icon redrawing attribute of the first icon and an icon adjustability attribute of the first icon in response to the second input;
determining the deformation controlling sign of the first icon based on the icon redrawing attribute and the icon adjustability attribute; and
displaying the deformation controlling sign in a preset region of the first icon.

7. The electronic device according to claim 6, wherein the icon redrawing attribute comprises a first redrawing attribute and a second redrawing attribute, the first redrawing attribute is icon redrawing being supported by a program corresponding to the first icon, and the second redrawing attribute is the icon redrawing being not supported by the program corresponding to the first icon; and the icon adjustability attribute comprises a first adjustability attribute and a second adjustability attribute, the first adjustability attribute is a space for deformation of the first icon being present in a display region of a preset range comprising the first icon, and the second adjustability attribute is the space for deformation of the first icon being absent in the display region of the preset range comprising the first icon; wherein the space for deformation of the first icon being present comprises: at least one vacant icon position being present.

8. The electronic device according to claim 7, wherein in the process of determining the deformation controlling sign of the first icon based on the icon redrawing attribute and the icon adjustability attribute by the electronic device, the program or the instructions, when executed by the processor, cause the electronic device to further perform following steps:

in a case that the icon redrawing attribute is the first redrawing attribute and the icon adjustability attribute is the first adjustability attribute, determining a first sign as the deformation controlling sign of the first icon, wherein the first sign indicates that the first icon supports deformation and that a space for deformation is present;

in a case that the icon redrawing attribute is the first redrawing attribute and the icon adjustability attribute is the second adjustability attribute, determining a second sign as the deformation controlling sign of the first icon, wherein the second sign indicates that the first icon supports deformation and that no space for deformation is present; or in a case that the icon redrawing attribute is the second redrawing attribute, determining a third sign as the deformation controlling sign of the first icon, wherein the third sign indicates that the first icon does not support deformation; wherein in the process of updating the first icon display parameter of the first icon by the electronic device, the program or the instructions, when executed by the processor, cause the electronic device to perform following step:

in a case that the deformation controlling sign of the first icon is the first sign, updating the first icon display parameter of the first icon.

9. A non-transitory computer-readable storage medium, wherein the non-transitory computer-readable storage medium stores a program that, when executed by a processor of an electronic device, causes the electronic device to perform following steps:

receiving a third input by a user on T first icons, wherein each of the T first icons comprises a deformation controlling sign;

updating the T first icons to a selected state in response to the third input;

receiving a first input performed by the user on a first icon; wherein a number of first icons is T, and T is greater than 1; and updating a first icon display parameter of the first icon in response to the first input; wherein the first icon display parameter comprises at least one of: shape or display size; wherein in the process of receiving the first input performed by the user on the first icon by the electronic device, the program or the instructions, when executed by the processor, cause the electronic device to perform following step:

receiving a first input performed by a user on a deformation controlling sign of a first icon in the T first icons; wherein the first icon is any one of the T first icons.

10. The non-transitory computer-readable storage medium according to claim 9, wherein the icon redrawing attribute comprises a first redrawing attribute and a second redrawing attribute, the first redrawing attribute is icon redrawing being supported by a program corresponding to the first icon, and the second redrawing attribute is the icon redrawing being not supported by the program corresponding to the first icon; and the icon adjustability attribute comprises a first adjustability attribute and a second adjustability attribute, the first adjustability attribute is a space for deformation of the first icon being present in a display region of a preset range comprising the first icon, and the second adjustability attribute is the space for deformation of the first icon being absent in the display region of the preset range comprising the first icon; wherein the space for deformation of the first icon being present comprises: at least one vacant icon position being present.

* * * * *